(12) United States Patent
Yang (10) Patent No.: US 11,163,225 B2
(45) Date of Patent: Nov. 2, 2021

(54) LASER PROJECTION STRUCTURE AND ELECTRONIC DEVICE

(71) Applicant: GUANGDONG OPPO MOBILE TELECOMMUNICATIONS CORP., LTD., Guangdong (CN)

(72) Inventor: Lang Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 288 days.

(21) Appl. No.: 16/374,223

(22) Filed: Apr. 3, 2019

(65) Prior Publication Data
US 2019/0310542 A1 Oct. 10, 2019

(30) Foreign Application Priority Data
Apr. 10, 2018 (CN) .......................... 201810317072.7

(51) Int. Cl.
| | |
|---|---|
| *G03B 21/20* | (2006.01) |
| *G02B 7/02* | (2021.01) |
| *G02B 27/09* | (2006.01) |
| *G03B 21/14* | (2006.01) |
| *H01S 3/02* | (2006.01) |
| *G02B 5/18* | (2006.01) |

(52) U.S. Cl.
CPC .......... *G03B 21/2033* (2013.01); *G02B 5/18* (2013.01); *G02B 7/023* (2013.01); *G02B 7/025* (2013.01); *G02B 27/0955* (2013.01); *G03B 21/142* (2013.01); *G03B 21/145* (2013.01); *H01S 3/025* (2013.01)

(58) Field of Classification Search
CPC ............... G03B 21/20; G03B 21/2086; G03B 21/2033; G03B 21/145; H04N 9/3161; G02B 7/023; G02B 7/025; G02B 27/0955; H01S 5/022; H01S 5/02253
See application file for complete search history.

(56) References Cited

U.S. PATENT DOCUMENTS

| | | | |
|---|---|---|---|
| 5,838,703 | A | 11/1998 | Lebby et al. |
| 2002/0024734 | A1 | 2/2002 | Nakabayashi |
| 2006/0153478 | A1 | 7/2006 | Yamada |

(Continued)

FOREIGN PATENT DOCUMENTS

| | | |
|---|---|---|
| CN | 201780442 | 3/2011 |
| CN | 203574741 | 4/2014 |

(Continued)

OTHER PUBLICATIONS

Yu, Changguo, CN206023923 U, Machine Translation in English, Mar. 15, 2017 (Year: 2017).*

(Continued)

*Primary Examiner* — Ryan D Howard
(74) *Attorney, Agent, or Firm* — Hodgson Russ LLP (57) ABSTRACT

A laser projection structure is provided. The laser projection structure includes a laser projector and a sealing member. The laser projector has a light emitting face. The sealing member includes a body and a resisting portion. The body is provided to the light emitting face and joined to the laser projector. The resisting portion extends from the body in a light emission direction of the laser projector.

18 Claims, 7 Drawing Sheets

(56) References Cited

U.S. PATENT DOCUMENTS

| | | |
|---|---|---|
| 2011/0007161 A1 | 1/2011 | Batchko et al. |
| 2012/0206046 A1 | 8/2012 | Huang et al. |
| 2016/0238855 A1 | 8/2016 | Kriman et al. |
| 2016/0306265 A1* | 10/2016 | Riel .................... G03B 21/142 |

FOREIGN PATENT DOCUMENTS

| | | |
|---|---|---|
| CN | 203800971 U | 8/2014 |
| CN | 105120017 A | 12/2015 |
| CN | 204993600 | 1/2016 |
| CN | 205490686 U | 8/2016 |
| CN | 106537212 | 3/2017 |
| CN | 206023923 | 3/2017 |
| CN | 107343122 | 11/2017 |
| CN | 206877030 | 1/2018 |
| CN | 108415178 | 8/2018 |
| CN | 108627936 | 10/2018 |
| CN | 208110176 | 11/2018 |
| TW | 201423964 | 6/2014 |
| WO | 2017030351 | 2/2017 |

OTHER PUBLICATIONS

SIPO, Second Office Action for CN Application No. 201810317072.7, dated Oct. 8, 2019.

EPO, Office Action for EP Application No. 19168059.4, dated Jul. 1, 2019.

SIPO, First Office Action for CN Application No. 201810317072.7, dated Jun. 25, 2019.

TIPO, Office Action for TW Application No. 108112303, dated Jun. 12, 2019.

IPI, Office Action for IN Application No. 201914014291, dated Oct. 28, 2020.

WIPO, English translation of the ISR and WO for PCT/CN2019/070766, Mar. 27, 2019.

* cited by examiner

LASER PROJECTION STRUCTURE AND ELECTRONIC DEVICE

PRIORITY INFORMATION

The present application claims priority to Chinese Patent Application No. 201810317072.7, filed Apr. 10, 2018, the entire disclosure of which is incorporated herein by reference.

FIELD

The present application relates to a field of three-dimensional imaging technologies, and more particularly to a laser projection structure and an electronic device.

BACKGROUND

A mobile terminal may be provided with a structured light projector which serves to emit a laser pattern towards a target space to obtain depth information of a target object.

SUMMARY

Embodiments of the present application provide a laser projection structure and an electronic device.

The laser projection structure according to embodiments of the present application includes a laser projector and a sealing member. The laser projector has a light emitting face. The sealing member includes a body and a resisting portion, the body is provided to the light emitting face and joined to the laser projector, and the resisting portion extends from the body in a light emission direction of the laser projector.

The laser projection structure according to other embodiments of the present application includes a laser projector and a sealing member. The laser projector has a light emitting face. The sealing member includes a body and a resisting portion, the body defines an accommodating cavity and is fitted over the laser projector, and the resisting portion extends from the body in a light emission direction of the laser projector.

The electronic device according to embodiments of the present application includes a housing, a cover plate and the laser projection structure. The cover plate is mounted to the housing, and the laser projection structure includes a laser projector and a sealing member. The laser projector has a light emitting face. The sealing member includes a body and a resisting portion, the body is provided to the light emitting face and joined to the laser projector, and the resisting portion extends from the body in a light emission direction of the laser projector; the laser projection structure is mounted in the housing, the light emitting face faces the cover plate, and the resisting portion abuts against the cover plate and is configured to seal a gap between the light emitting face and the cover plate.

BRIEF DESCRIPTION OF THE DRAWINGS

These and other aspects and advantages of embodiments of the present application will become apparent and more readily appreciated from the following descriptions made with reference to the drawings, in which.

DETAILED DESCRIPTION

Specific embodiments of the present application will be described further with reference to accompanying drawings. The same or similar reference numerals are used to indicate same or similar members or members with same or similar functions throughout the description.

Additionally, the embodiments of the present application described herein with reference to drawings are explanatory, illustrative, and used to generally understand the present application. The embodiments shall not be construed to limit the present application.

In the present application, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature. While a first feature "below," "under," or "on bottom of" a second feature may include an embodiment in which the first feature is right or obliquely "below," "under," or "on bottom of" the second feature, or just means that the first feature is at a height lower than that of the second feature.

Embodiments of the present application provide a laser projection structure and an electronic device.

The laser projection structure according to embodiments of the present application includes a laser projector and a sealing member. The laser projector has a light emitting face. The sealing member includes a body and a resisting portion, the body is provided to the light emitting face and joined to the laser projector, and the resisting portion extends from the body in a light emission direction of the laser projector.

The laser projection structure according to other embodiments of the present application includes a laser projector and a sealing member. The laser projector has a light emitting face. The sealing member includes a body and a resisting portion, the body defines an accommodating cavity and is fitted over the laser projector, and the resisting portion extends from the body in a light emission direction of the laser projector.

The electronic device according to embodiments of the present application includes a housing, a cover plate and the laser projection structure. The cover plate is mounted to the housing, and the laser projection structure includes a laser projector and a sealing member. The laser projector has a light emitting face. The sealing member includes a body and a resisting portion, the body is provided to the light emitting face and joined to the laser projector, and the resisting portion extends from the body in a light emission direction of the laser projector; the laser projection structure is mounted in the housing, the light emitting face faces the cover plate, and the resisting portion abuts against the cover plate and is configured to seal a gap between the light emitting face and the cover plate.

A laser projection structure 30 according to embodiments of the present application includes a laser projector 31 and a sealing member 32. The laser projector 31 has a light emitting face 3161. The sealing member 32 includes a body 321 and a resisting portion 322, the body 321 is provided to the light emitting face 3161 and joined to the laser projector 31, and the resisting portion 322 extends from the body 321 in a light emission direction of the laser projector 31.

In some embodiments, the laser projector 31 includes a light emitting opening 317 defined in the light emitting face 3161, and the resisting portion 322 is formed in a ring shape and provided around the light emitting opening 317.

In some embodiments, a width of a section of the resisting portion 322 gradually decreases in the light emission direction of the laser projector 31.

In some embodiments, the resisting portion 322 includes an inner side wall 3221 and an outer side wall 3222, and in the light emission direction of the laser projector 31, the inner side wall 3221 is inclined outwards, and/or the outer side wall 3222 is inclined inwards.

In some embodiments, the body 321 defines an accommodating cavity 3213, and the body 321 is fitted over the laser projector 31 such that the laser projector 31 extends into the accommodating cavity 3213.

In some embodiments, the laser projector 31 includes a lens barrel 312, and the body 321 is fitted over the lens barrel 312.

In some embodiments, the laser projector 31 includes a lens barrel 312, a diffractive element 315 and a protective cover 316. The diffractive element 315 is received in the lens barrel 312, the protective cover 316 is mounted to the lens barrel 312 to prevent the diffractive element 315 from coming out of the lens barrel 312, and the body 312 is fitted over the protective cover 316.

In some embodiments, the body 321 includes a top 3211 and a side 3212. The top 3211 is attached to the protective cover 316, the side 3212 extends from the top 3211, and the side 3212 and the top 3211 cooperatively define the accommodating cavity 3213.

In some embodiments, the resisting portion 322 includes the inner side wall 3221 and the outer side wall 3222; in the light emission direction of the laser projector 31, the inner side wall 3221 is inclined outwards, and the outer side wall 3222 is perpendicular to the top 3211; or in the light emission direction of the laser projector 31, the outer side wall 3222 is inclined inwards, and the inner side wall 3221 is perpendicular to the top 3211.

In some embodiments, the sealing member 32 is made of silicone or rubber.

The electronic device 100 according to embodiments of the present application includes a housing 10, a cover plate 20 and the laser projection structure 30 according to any of the above-described embodiments. The cover plate 20 is mounted to the housing 10. The laser projection structure 30 is mounted in the housing 10, the light emitting face 3161 faces the cover plate 20, and the resisting portion 322 abuts against the cover plate 20 and serves to seal a gap between the light emitting face 3161 and the cover plate 20.

In some embodiments, the housing 10 includes a front casing 11 and a rear casing 12, and the cover plate 20 is mounted to the front casing 11, the laser projection structure 30 is mounted to the front casing 11, and the rear casing 12 abuts against a side of the laser projector 31 opposite to the light emitting face 3161; or the electronic device 100 further includes a bracket 50 mounted between the front casing 11 and the rear casing 12, and the laser projection structure 30 is mounted to the bracket 50.

Figure 1:
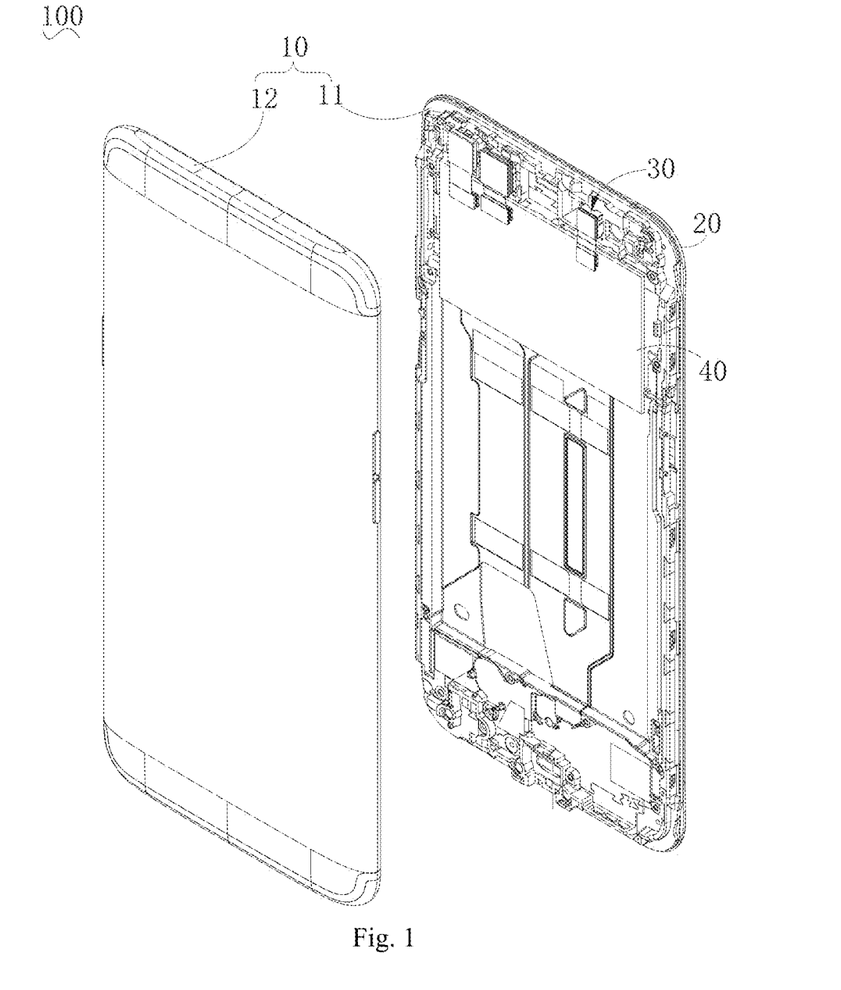
FIG. 1 illustrates an exploded perspective view of an electronic device of an embodiment of the present application.

As illustrated in FIG. 1, the electronic device 100 according to embodiments of the present application includes the housing 10, the cover plate 20 and the laser projection structure 30. The electronic device 100 may be a mobile phone, a tablet computer, a notebook computer, a game machine, a head-mounted display device, an access control system, a teller machine, or the like. In embodiments of the present application, the electronic device 100 is exemplified by the mobile phone. It could be understood that, specific form of the electronic device 100 may be others, which is not limited herein.

Figure 2:
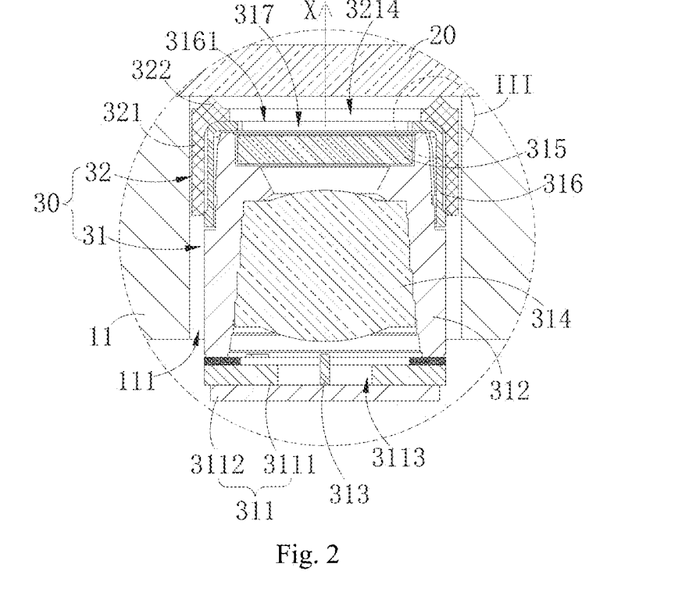
FIG. 2 illustrates a partial sectional view of an electronic device of an embodiment of the present application.

As illustrated in FIG. 2, the housing 10 may serve as an outer casing of the electronic device 100, the housing 10 may serve as a mounting support for the cover plate 20 and the laser projection structure 30 and may provide dustproof, waterproof and shatterproof protection for the laser projection structure 30, and a display screen, a battery or other components may be mounted to the housing 10. In embodiments of the present application, the housing 10 includes the front casing 11 and the rear casing 12, the front casing 11 and the rear casing 12 are joined to each other, and the laser projection structure 30 is received between the front casing 11 and the rear casing 12. The front casing 11 and the rear casing 12 may be made of materials such as stainless steel, aluminum alloy, plastic, etc. The front casing 11 may also define an through hole 111, functional modules of the electronic device 100, such as the laser projection structure 30, an infrared imaging module, a visible light imaging module, a receiver, etc., may be inserted into the through hole 111, and emit signals such as optical signal, acoustic signal to the outside or receive optical signal or the like from the outside.

The cover plate 20 is mounted to the housing 10. Specifically, in the embodiments of the present application, the cover plate 20 is mounted to the front casing 11, and the cover plate 20 and the laser projection structure 30 are mounted to the front casing 11 from two opposite sides of the front casing 11. The cover plate 20 is mounted to the front casing 11 so as to cover the display screen of the electronic device 100. The cover plate 20 may be light transparent, and may be made of light transparent glass, resin, plastic and so on.

As illustrated in FIGS. 1 and 2, the laser projection structure 30 is mounted in the housing 10. In the embodiments of the present application, the laser projection structure 30 is mounted to the front casing 11. Specifically, the laser projection structure 30 is inserted into the through hole 111 of the front casing 11 to be mounted to the front casing 11, and glue may be filled between the laser projection structure 30 and an inner wall of the through hole 111 to assist fixation of the laser projection structure 30. Two sides of the laser projection structure 30 abut against the cover plate 20 and the rear casing 12 respectively to further fix the laser projection structure 30. The laser projection structure 30 includes the laser projector 31 and the sealing member 32.

The laser projector 31 includes a substrate assembly 311, the lens barrel 312, a light source 313, a collimating element 314, the diffractive element 315 and the protective cover 316. The substrate assembly 311 includes a substrate 3112 and a circuit board 3111, the circuit board 3111 is provided to the substrate 3112, and the circuit board 3111 is configured to be electrically coupled to a main board 40 of the electronic device 100. The circuit board 3111 may be a printed circuit board, a flexible circuit board or a rigid-flex board. The lens barrel 312 is provided to the substrate assembly 311, and the lens barrel 312 defines a hollow cavity. The light source 313 is provided to the substrate assembly 311 and may be provided in a receiving hole 3113 of the circuit board 3111 and electrically coupled to the circuit board 3111 through a wire (not illustrated). The light source 313 may be a vertical cavity surface emitting laser (VCSEL) or an edge-emitting laser (EEL). Driven by electric power, the light source 313 emits laser, and the laser may be infrared light. The collimating element 314 is provided in the lens barrel 312, the collimating element 314 may be a lens and is configured to collimate the laser emitted from the light source 313. The diffractive element 315 is provided in the lens barrel 312, and the laser collimated by the collimating element 314 passes through the diffractive element 315. The diffractive element 315 diffracts the laser into a predetermined laser pattern, and the laser is sent out from the laser projector 31. The protective cover 316 is mounted to the lens barrel 312.

Specifically, the protective cover 316 covers the lens barrel 312, the protective cover 316 and the lens barrel 312 may be fixedly coupled in a detachable manner, and the protective cover 316 is configured to restrict the diffractive element 315 in the lens barrel 312 to prevent the diffractive element 315 from coming out of the lens barrel 312. The laser projector 31 has the light emitting face 3161, the light emitting face 3161 faces the cover plate 20, a side of the laser projector 31 opposite to the light emitting face 3161 abuts against the rear casing 12, the laser passes through the light emitting face 3161 and exits from the laser projector 31, and the laser then passes through the cover plate 20 and exits from the electronic device 100. Specifically, the light emitting face 3161 defines the light emitting opening 317, the laser passes through the light emitting opening 317 to exit from the laser projector 31. In embodiments of the present application, the light emitting opening 317 is defined in the protective cover 316.

Figure 3:
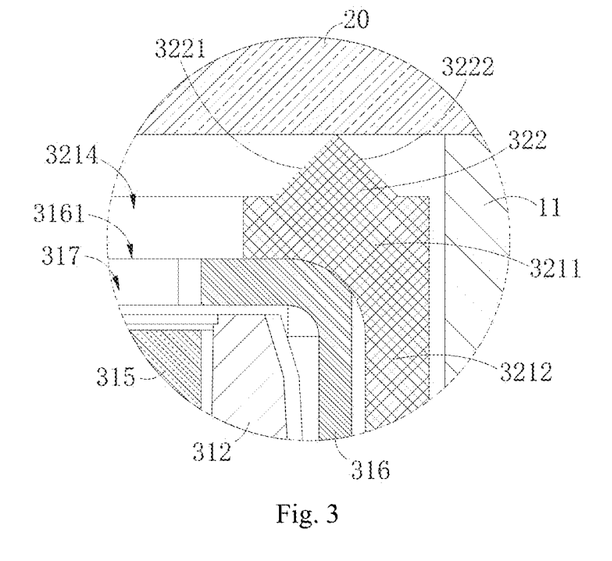
FIG. 3 illustrates an enlarged view of portion III of the electronic device in FIG. 2.

As illustrated in FIGS. 2 and 3, the sealing member 32 is mounted to the laser projector 31, the sealing member 32 is configured to seal a gap between the light emitting face 3161 and the cover plate 20, so as to prevent impurities such as dust or moisture from entering the laser projector 31 through the light emitting opening 317. The sealing member 32 includes the body 321 and the resisting portion 322. The sealing member 32 may be made of a material having good elasticity, for example, the sealing member 32 may be made of silicone or rubber, etc.

Figure 4:
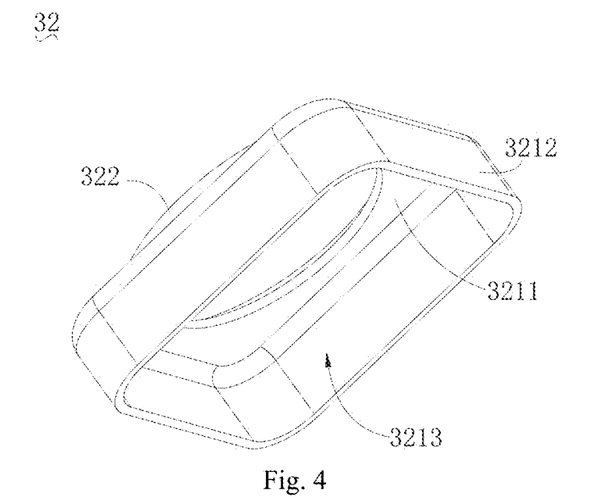
FIG. 4 illustrates a perspective view of a sealing member of a laser projection structure of an embodiment of the present application.
Figure 5:
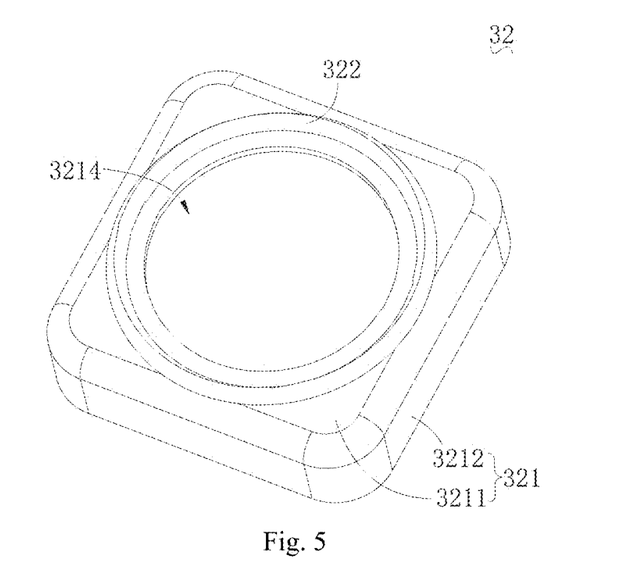
FIG. 5 illustrates a perspective view of a sealing member of a laser projection structure of an embodiment of the present application in another angle.

As illustrated in FIGS. 4 and 5, the body 321 is fixedly coupled to the laser projector 31. Specifically, the body 321 is provided to the light emitting face 3161 and fixedly coupled to the laser projector 31. In embodiments of the present application, the body 321 is fixed to the protective cover 316, and the body 321 includes the top 3211 and the side 3212. The top 3211 is attached to the protective cover 316, and the top 3211 defines a light passage opening 3214, and the light passage opening 3214 is aligned with the light emitting opening 317. The side 3212 extends from the top 3211, and the side 3212 and the top 3211 cooperatively define the accommodating cavity 3213. The body 321 is fitted over the laser projector 31 to extend the laser projector 31 into the accommodating cavity 3213. Specifically, the protective cover 316 extends into the accommodating cavity 3213, such that the body 321 is fitted over the protective cover 316. A shape of the accommodating cavity 3213 may be similar to a shape and a size of the protective cover 316, and the body 321 may tightly wrap the protective cover 316, such that the body 321 and the protective cover 316 can be joined together in a better way.

The resisting portion 322 extends from the body 321 in the light emission direction of the laser projector 31 (such as an X direction illustrated in FIG. 2). Specifically, the resisting portion 322 extends from the top 3211 of the body 321. The resisting portion 322 is configured to abut against the cover plate 20 so as to seal the gap between the light emitting face 3161 and the cover plate 20, a top end of the resisting portion 322 is squeezed and then elastically deformed to be more tightly attached to the cover plate 20, and the dust, the moisture, or the like cannot easily enter the laser projection structure 30 via the gap between the resisting portion 322 and the cover plate 20. In embodiments of the present application, the resisting portion 322 is formed in the ring shape and provided around the light emitting opening 317. Specifically, the resisting portion 322 may be a circular ring shape, a rectangular ring shape, an elliptical ring shape, or other shapes, and the resisting portion 322 is provided around the light emitting opening 317 to prevent the impurities from entering the light emitting opening 317 from a plurality of directions, and provide protection for the laser projector 31 in a better way.

The resisting portion 322 includes the inner side wall 3221 and the outer side wall 3222, the inner side wall 3221 is closer to the light passage opening 3214 than the outer side wall 3222, and the inner side wall 3221 and the outer side wall 3222 are intersected at the top end of the resisting portion 322. The inner side wall 3221 and the outer side wall 3222 may be simultaneously deformed when this top end is squeezed. In embodiments of the present application, in the light emission direction of the laser projector 31, a width of a section of the resisting portion 322 gradually decreases. That is to say, in the light emission direction of the laser projector 31, a distance between the inner side wall 3221 and the outer side wall 3222 gradually decreases, such that stress is relatively concentrated at a portion of the resisting portion 322 resisting against the cover plate 20, the resisting portion 322 is more tightly attached to the cover plate 20, and the resisting portion 322 has better sealing effect. In the embodiment illustrated in FIG. 3, in the light emission direction of the laser projector 31, the inner side wall 3221 is inclined outwards, and the outer side wall 3222 is inclined inwards. In embodiments of the present application, the light emission direction is the same as a direction in which the light emitting face 3161 is directed at the cover plate 20.

During the installation of the electronic device 100, the sealing member 32 may be mounted in the laser projector 31 so that the laser projection structure 30 is constituted, then the laser projection structure 30 may be mounted in the through hole 111 of the front casing 11, then the rear casing 12 may be joined to the front casing 11 to render the rear casing 12 to abut against a side of the laser projector 31, and finally the cover plate 20 may be joined to the front casing 11, such that the cover plate 20 abuts against the resisting portion 322 of the sealing member 32.

Also, the cover plate 20 may be first joined to the front casing 11, then the laser projection structure 30 may be mounted in the through hole 111 of the front casing 11 in which case the resisting portion 322 contacts the cover plate 20, and finally the rear casing 12 is joined to the front casing 11 and the rear casing 12 abuts against the laser projector 31, such that the laser projector 31 squeezes the sealing member 21, and the resisting portion 322 is squeezed and deformed to be tightly attached to the cover plate 20.

In the related art, the dust or other impurities can easily enter an interior of the structured light projector through the light emitting face of the structured light projector, resulting in that the structured light projector cannot operate normally. In the electronic device 100 of embodiments of the present application, the resisting portion 322 of the sealing member 32 extends from the body 321 in the light emission direction of the laser projector 31 and abuts against the cover plate 20. The resisting portion 322 can seal the gap between the light emitting face 3161 of the laser projector 31 and the cover plate 20, to prevent the dust or other impurities from entering the interior of the laser projector 31.

Figure 6:
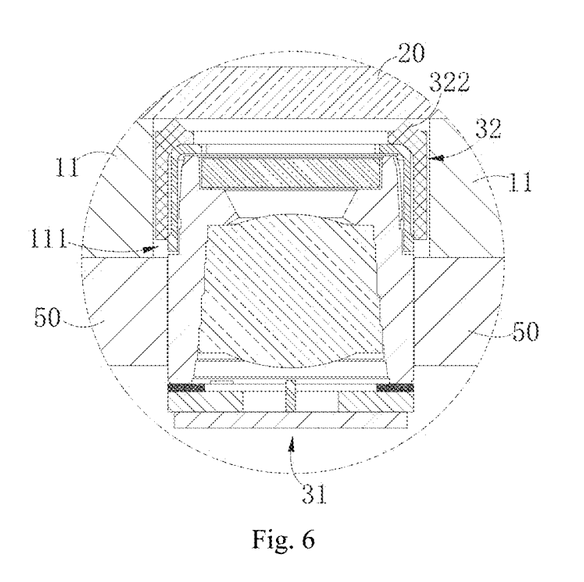
FIG. 6 illustrates a partial sectional view of an electronic device of another embodiment of the present application.

As illustrated in FIGS. 1 and 6, in some embodiments, the electronic device 100 further includes the bracket 50 mounted between the front casing 11 and the rear casing 12, and the laser projection structure 30 is mounted to the bracket 50. Specifically, the laser projector 31 is mounted to the bracket 50 and protrudes from the bracket 50, a portion of the laser projector 31 protruding from the bracket 50 and the sealing member 32 together pass through the through hole 111 of the front casing 11. The resisting portion 322 of the sealing member 32 abuts against the cover plate 20.

As illustrated in FIG. 2, in some embodiments, the laser projector 31 may also not include the protective cover 316, the light emitting face 3161 is a top face of the lens barrel 312, the body 321 of the sealing member 32 is directly fitted over the lens barrel 312. The top 3211 of the body 321 is joined to the light emitting face 3161, the side 3212 of the body 321 is fitted over the lens barrel 312, and meanwhile the top 3211 of the body 321 can prevent the diffractive element 315 from coming out of the lens barrel 312.

As illustrated in FIGS. 2 and 3, in some embodiments, the specific structure of the body 321 is not limited by the above discussion. In an example, the body 321 may not include the above side 3212 and not define the accommodating cavity 3213, the top 3211 of the body 321 is directly joined to the protective cover 316, for example, the top 3211 is secured to the protective cover 316 by gluing, and the resisting portion 322 extends from the body 321.

Figure 7A:
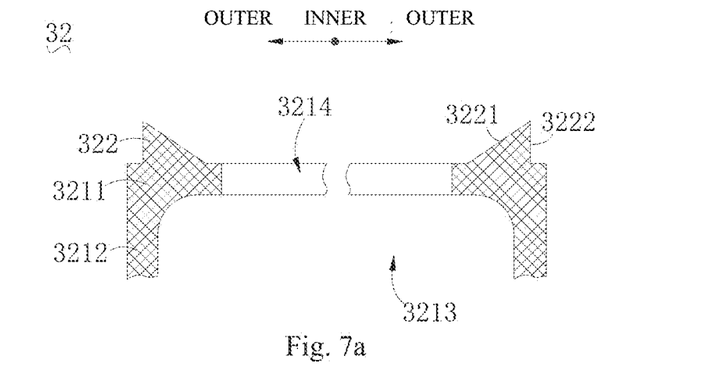
FIGS. 7a and 7b illustrate sectional views of a sealing member of a laser projection structure of embodiments of the present application.
Figure 7B:
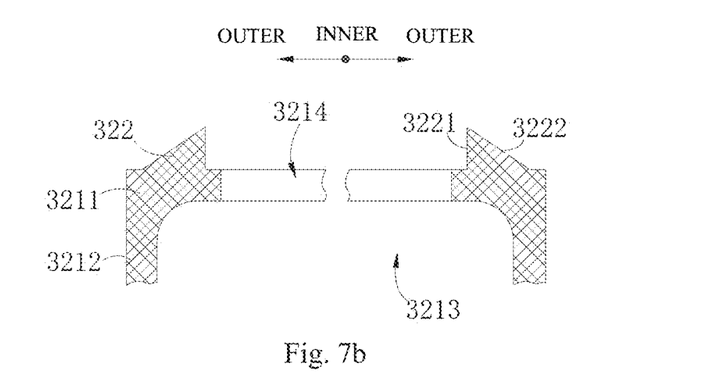

As illustrated in FIGS. 3 and 7, in some embodiments, the extending directions of the inner side wall 3221 and the outer side wall 3222 of the resisting portion 322 may also have other forms. In an example illustrated in FIG. 7a, in the light emission direction of the laser projector 31, the inner side wall 3221 may be inclined outwards, and the outer side wall 3222 is perpendicular to the top 3211. Thus, when the resisting portion 322 is squeezed by the cover plate 20, the resisting portion 322 will be inclined outwards rather than inclined inwards, so as to prevent the resisting portion 322 from covering the light passage opening 3214. In an example illustrated in FIG. 7b, in the light emission direction of the laser projector 31, the outer side wall 3222 may also be inclined inwards, and the inner side wall 3221 is perpendicular to the top 3211.

Figure 8:
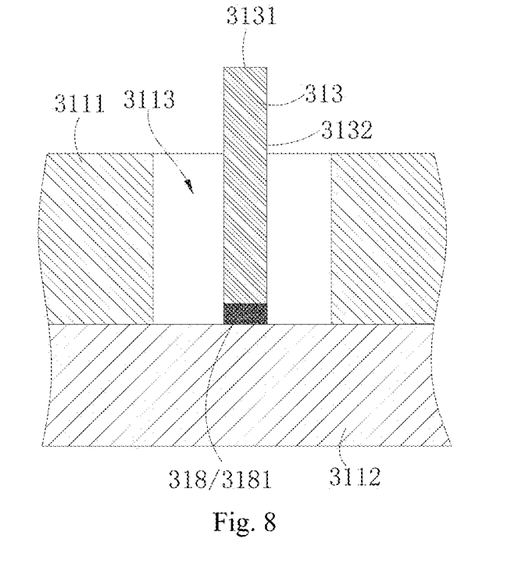
FIGS. 8 to 10 illustrate partial schematic views of a laser projector of a laser projection structure of an embodiment of the present application.

As illustrated in FIGS. 2 and 8, in some embodiments, the light source 313 is configured as an edge-emitting laser 313. Specifically, the edge-emitting laser 313 may be a distributed feedback laser (DFB). The edge-emitting laser 313 is in a column shape as a whole, an end face of the edge-emitting laser 313 away from the substrate assembly 311 has the light emitting face 3131, the laser is emitted from the light emitting face 3131, and the light emitting face 3131 faces the collimating element 314. By employing the edge-emitting laser 313 as the light source, on one hand, the edge-emitting laser 313 has smaller temperature drift than the VCSEL array; on the other hand, since the edge-emitting laser 313 is a single-point light emitting structure without need for designing the array structure, the fabrication is simple, and the cost of the light source 313 of the laser projector 31 is lower.

Figure 9:
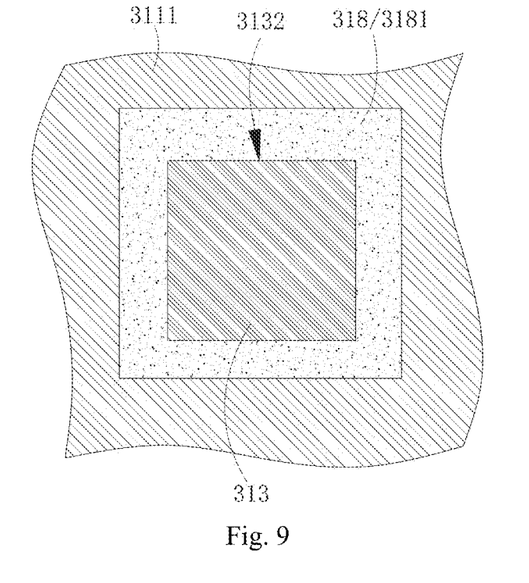

As illustrated in FIG. 9, in some embodiments, the laser projector 31 further includes a fixing member 318, and the fixing member 318 is configured to fix the edge-emitting laser 313 to the substrate assembly 311. During propagation of the laser of the distributed feedback laser, power gain is obtained by means of feedback of a grating structure. In order to improve the power of the distributed feedback laser, it is necessary to increase an input current and/or increase the length of the distributed feedback laser. Since the increased input current will make power consumption of the distributed feedback laser increase and cause serious heat generation problem, the length of the distributed feedback laser needs to be increased in order to ensure the normal operation of the distributed feedback laser, such that the distributed feedback laser generally is formed in an elongated strip structure. When the light emitting face 3131 of the edge-emitting laser 313 faces the collimating element 314, the edge-emitting laser 313 is arranged vertically. Since the edge-emitting laser 313 is formed in the elongated strip structure, accidents such as drop, displacement or wobbling can easily happen to the edge-emitting laser 313. Thus, the edge-emitting laser 313 can be fixed by providing the fixing member 318, to prevent accidents such as drop, displacement or wobbling from happening to the edge-emitting laser 313.

Specifically, in some embodiments, the fixing member 318 includes a sealing adhesive 3181, and the sealing adhesive 3181 is provided between the edge-emitting laser 313 and the substrate assembly 311. More specifically, in an example illustrated in FIG. 8, a face of the edge-emitting laser 313 opposite to the light emitting face 3131 is adhered to the substrate assembly 311 (specifically substrate 3112). In an example illustrated in FIG. 9, a side face 3132 of the edge-emitting laser 313 may also be adhered to the substrate assembly 311. The sealing adhesive 3181 wraps the periphery of the side face 3132, or may merely adhere one face of the side face 3132 to the substrate assembly 311 or adhere some faces of the side face 3132 to the substrate assembly 311. Further, the sealing adhesive 3181 may be a thermally conductive adhesive to transfer heat produced by the operation of the light source 313 to the substrate assembly 311.

Figure 10:
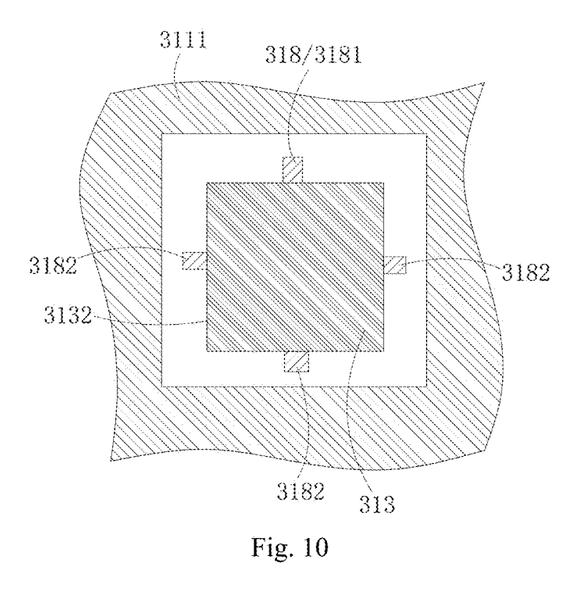

As illustrated in FIG. 10, in some embodiments, the fixing member 318 includes a support frame 3182, the support frame 3182 is provided to the substrate assembly 311, and the edge-emitting laser 313 is secured to the support frame 3182. A plurality of support frames 3182 may be provided, the plurality of support frames 3182 can cooperatively surround the edge-emitting laser 313, and the edge-emitting laser 313 can be mounted among the plurality of support frames 3182 when mounted. In an example, the plurality of support frames 3182 cooperatively clamp the edge-emitting laser 313 to further prevent the edge-emitting laser 313 from wobbling. The support frame 3182 may be elastic, and when the edge-emitting laser 313 is clamped among the plurality of support frames 3182, the plurality of support frames 3182 is stretched and clamps the edge-emitting laser 313.

Reference throughout this specification to "an embodiment," "some embodiments," "an illustrative embodiment,"

"an example," "a specific example," or "some examples," means that a particular feature, structure, material, or characteristic described in connection with the embodiment or example is included in at least one embodiment or example of the present application. Thus, the appearances of the phrases in various places throughout this specification are not necessarily referring to the same embodiment or example of the present application. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may comprise one or more of this feature. In the description of the present application, the term "a plurality of" means two or more than two, unless specified otherwise.

Although explanatory embodiments of the present application have been shown and described, it would be appreciated by those skilled in the art that the above embodiments are exemplary and cannot be construed to limit the present application, and changes, alternatives, and modifications can be made in the embodiments without departing from the scope of the present application. The scope of the present application is limited by the claims and its equivalence.

What is claimed is:

1. A laser projection structure, comprising:
a laser projector having a light emitting face; and
a sealing member comprising a body and a resisting portion, the body being provided to the light emitting face and joined to the laser projector, and the resisting portion extending from the body in a light emission direction of the laser projector,
wherein a width of a section of the resisting portion decreases in the light emission direction of the laser projector.

2. The laser projection structure according to claim 1, wherein the laser projector comprises a light emitting opening defined in the light emitting face, and the resisting portion is formed in a ring shape and configure to surround the light emitting opening.

3. The laser projection structure according to claim 1, wherein the resisting portion comprises an inner side wall and an outer side wall, and in the light emission direction of the laser projector, the inner side wall is inclined outwards, and/or the outer side wall is inclined inwards.

4. The laser projection structure according to claim 1, wherein the body defines an accommodating cavity and is fitted over the laser projector such that the laser projector extends into the accommodating cavity.

5. The laser projection structure according to claim 4, wherein the laser projector comprises a lens barrel, and the body is fitted over the lens barrel.

6. The laser projection structure according to claim 4, wherein the laser projector comprises a lens barrel, a diffractive element and a protective cover, the diffractive element is received in the lens barrel, the protective cover is mounted to the lens barrel to prevent the diffractive element from coming out of the lens barrel, and the body is fitted over the protective cover.

7. The laser projection structure according to claim 6, wherein the body comprises a top and a side, the top is attached to the protective cover, the side extends from the top, and the side and the top cooperatively define the accommodating cavity.

8. The laser projection structure according to claim 7, wherein the resisting portion comprises an inner side wall and an outer side wall;
in the light emission direction of the laser projector, the inner side wall is inclined outwards, and the outer side wall is perpendicular to the top; or
in the light emission direction of the laser projector, the outer side wall is inclined inwards, and the inner side wall is perpendicular to the top.

9. The laser projection structure according to claim 1, wherein the sealing member is made of silicone or rubber.

10. An electronic device, comprising a housing, a cover plate and a laser projection structure, the cover plate being mounted to the housing, and the laser projection structure comprising:
a laser projector having a light emitting face; and
a sealing member comprising a body and a resisting portion, the body being provided to the light emitting face and joined to the laser projector, and the resisting portion extending from the body in a light emission direction of the laser projector;
wherein the laser projection structure is mounted in the housing, the light emitting face faces the cover plate, and the resisting portion abuts against the cover plate and is configured to seal a gap between the light emitting face and the cover plate.

11. The electronic device according to claim 10, wherein the body comprises a top and a side, the top is attached to the laser projector, the side extends from the top, and the side and the top cooperatively define an accommodating cavity.

12. The electronic device according to claim 10, wherein the housing comprises a front casing and a rear casing, the cover plate is mounted to the front casing,
the laser projection structure is mounted to the front casing, and the rear casing abuts against a side of the laser projector opposite to the light emitting face; or
the electronic device further comprises a bracket mounted between the front casing and the rear casing, and the laser projection structure is mounted to the bracket.

13. The electronic device according to claim 12, wherein the front casing defines an through hole, the laser projection structure is inserted into the through hole to be mounted to the front casing, and glue is filled between the laser projection structure and an inner wall of the through hole.

14. A laser projection structure, comprising:
a laser projector having a light emitting face; and
a sealing member comprising a body and a resisting portion, the body defining an accommodating cavity and being fitted over the laser projector, and the resisting portion extending from the body in a light emission direction of the laser projector,
wherein the laser projector comprises a light emitting opening defined in the light emitting face, the body comprises a top and a side, the top defines a light passage opening, and the light passage opening is aligned with the light emitting opening.

15. The laser projection structure according to claim 14, wherein the resisting portion is formed in a ring shape and configure to surround the light emitting opening.

16. The laser projection structure according to claim 14, wherein the laser projector comprises a lens barrel, a diffractive element and a protective cover, the diffractive element is received in the lens barrel, the protective cover is mounted to the lens barrel to prevent the diffractive element from coming out of the lens barrel, and the body is fitted over the protective cover.

17. The laser projection structure according to claim 16, wherein the laser projector further comprises a substrate assembly, and the lens barrel is provided to the substrate assembly.

18. The laser projection structure according to claim 16, wherein the protective cover and the lens barrel are fixedly coupled in a detachable manner.

* * * * *